United States Patent
Fang et al.

(10) Patent No.: US 11,283,568 B2
(45) Date of Patent: Mar. 22, 2022

(54) SIGNAL SENDING METHOD AND APPARATUS, SIGNAL RECEIVING METHOD AND APPARATUS, AND COMPUTER STORAGE MEDIUM

(71) Applicant: XI'AN ZHONGXING NEW SOFTWARE CO., LTD., Shaanxi (CN)

(72) Inventors: Huiying Fang, Guangdong (CN); Bo Dai, Guangdong (CN); Xianming Chen, Guangdong (CN); Wei Lin, Guangdong (CN); Shupeng Li, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 0 days.

(21) Appl. No.: 16/764,908

(22) PCT Filed: Sep. 28, 2018

(86) PCT No.: PCT/CN2018/108381
§ 371 (c)(1),
(2) Date: May 18, 2020

(87) PCT Pub. No.: WO2019/095875
PCT Pub. Date: May 23, 2019

(65) Prior Publication Data
US 2020/0344021 A1 Oct. 29, 2020

(30) Foreign Application Priority Data
Nov. 17, 2017 (CN) .......................... 201711147938.6

(51) Int. Cl.
H04L 5/00 (2006.01)
H04L 27/26 (2006.01)

(52) U.S. Cl.
CPC .......... *H04L 5/0048* (2013.01); *H04L 5/0007* (2013.01); *H04L 5/0094* (2013.01); *H04L 27/2613* (2013.01)

(58) Field of Classification Search
CPC ...... H04L 5/0048; H04L 5/005; H04L 5/0051
See application file for complete search history.

(56) References Cited

U.S. PATENT DOCUMENTS

2014/0341018 A1 11/2014 Bhushan et al.
2015/0189638 A1* 7/2015 Lin ..................... H04L 5/0035
370/330

(Continued)

FOREIGN PATENT DOCUMENTS

CN 102469059 A 5/2012
CN 104125643 A 10/2014

(Continued)

OTHER PUBLICATIONS

European Search Report and Written Opinion for the European Patent Application No. EP18879724, dated Jul. 16, 2021, 10 pages.

(Continued)

Primary Examiner — Kevin Kim
(74) Attorney, Agent, or Firm — Kacvinsky Daisak Bluni PLLC

(57) ABSTRACT

Provided are signal sending method and apparatus, and a computer storage medium. The method includes: sending a reference signal on an invalid subframe. The method further includes: in a guard band mode, if a downlink timeslot of a special subframe includes N downlink symbols, determining to send the reference signal on the N downlink symbols. The method further includes:
mapping and spreading a code word on a preset number of subframes or resource units for sending the mapped and spread code word. The method further includes: sending the reference signal on an orthogonal frequency division mul- (Continued)

tiplexing (OFDM) symbol, where a resource element other than a resource element where the reference signal is located on the OFDM symbol is a muting resource element, and no data is mapped or sent on the muting resource element.

19 Claims, 12 Drawing Sheets

(56) References Cited

U.S. PATENT DOCUMENTS

| | | | |
|---|---|---|---|
| 2017/0214508 A1 | 7/2017 | Lee et al. | |
| 2017/0264407 A1* | 9/2017 | Hwang | H04W 52/241 |
| 2018/0324731 A1* | 11/2018 | Liu | H04L 27/2666 |

FOREIGN PATENT DOCUMENTS

| | | |
|---|---|---|
| CN | 106059978 A | 10/2016 |
| CN | 106470393 A | 3/2017 |
| CN | 106817210 A | 6/2017 |
| CN | 108111287 A | 6/2018 |
| EP | 2665211 A2 | 11/2013 |
| WO | 2017136003 A1 | 8/2017 |

OTHER PUBLICATIONS

Qualcomm Incorporated. "Remaining Open Issues on PDCCH Structure" 3GPP TSG RAN WG1 #90bis, R1-1718554, Oct. 13, 2017.

Zte et al. "Codebook Based UL Transmission" 3GPP TSG RAN WG1 Meeting NR#3, R1-1715431, Sep. 21, 2017.

Zte et al. "Remaining Details of Codeword Mapping" 3GPP Tsg ran WG1 Meeting #90bis R1-1717416, Oct. 13, 2017.

Zte et al. "On Long-PUCCH for up to 2 Bits" 3GPP TSG RAN WG1 Meeting 90bis, R1-1717515, Oct. 13, 2017.

International Search Report for the International Patent Application No. PCT/CN2018/108381, dated Jan. 2, 2019, 3 pages.

CMCC, "RS and transmission mode of DwPTS for new special subframe configurations" 3GPP TSG-RAN WG1 #69—Prague, CZ, May 21-25, 2012—R1-122717, 3 pages.

Pantech, "Considerations on reference signal in TDD special subframe" 3GPP TSG RAN WG1 Meeting #72-bis—Chicago, USA, Apr. 15-19, 2013—R1-131523, 4 pages.

Qualcomm Incorporated, "CSI Acquisition for Reciprocity Based Operation" 3GPP TSG RAN WG1 NR Ad-Hoc#2—Qingdao, China, June 27-30, 2017—R1-1711164, 6 pages.

Nokia, "Reducing cell-search time for feNB-IoT" 3GPP TSG RAN WG1 Meeting #90-bis—Prague, Czech Republic, Oct. 9-13, 2017—R1-1717230, 2 pages.

Zanqiang et al., "Optimization mechanism for network-coding based on rate-match" Journal of Communication—vol. 34, No. 11, Nov. 2013, 24 pages.

HU Wei., "The Optimization of TD-LTE Special Sub-Frame Configuration" China Mobile Group Henan Co., Ltd. Zhengzhou—Dec. 12, 2013, 10 pages.

Search Report for Chinese Patent Application No. 2017111479386, dated Mar. 23, 2021, 6 pages.

Office Action for Chinese Patent Application No. 2017111479386, dated Mar. 23, 2021, 7 pages.

* cited by examiner

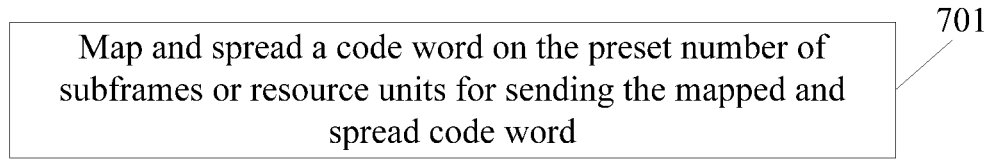
FIG. 7
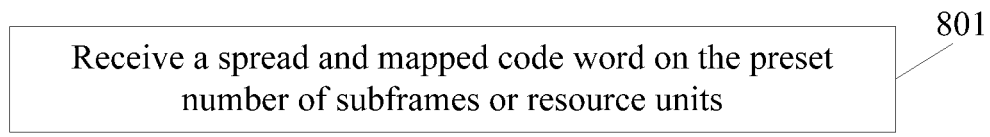
FIG. 8
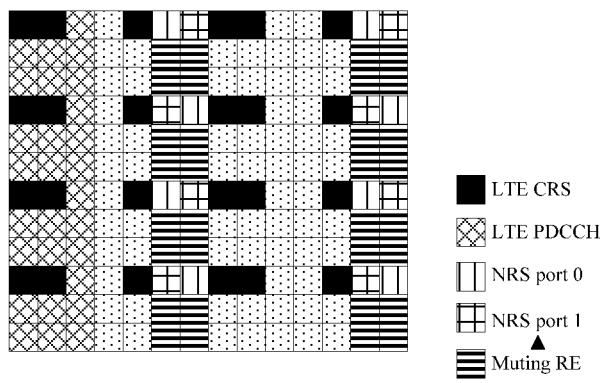
FIG. 9
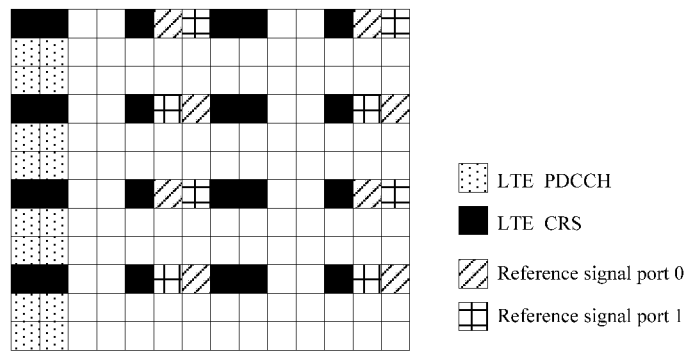
FIG. 10 ( a )

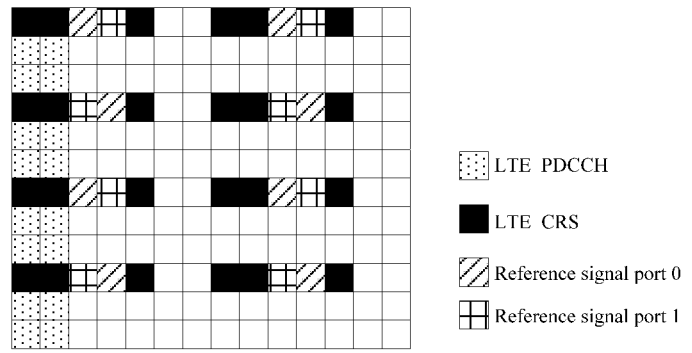
FIG. 10 ( b )
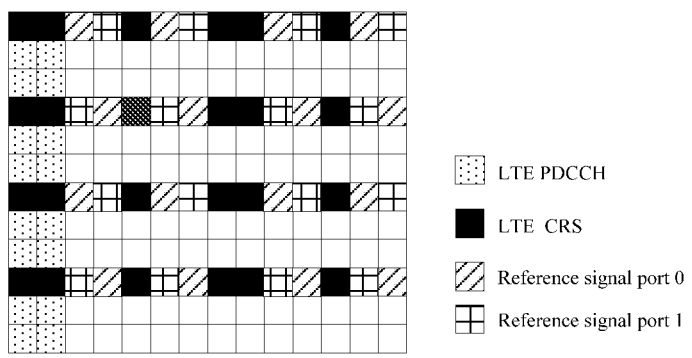
FIG. 11 ( a )
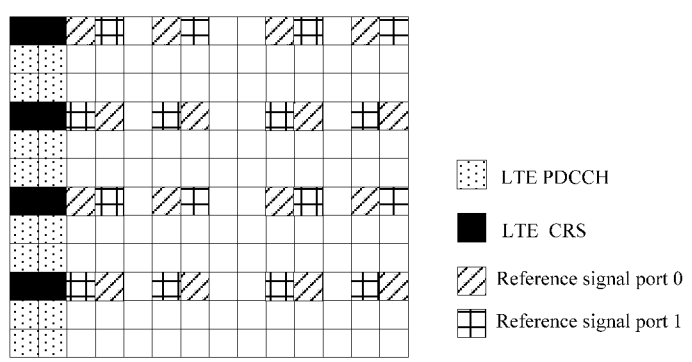
FIG. 11 ( b )

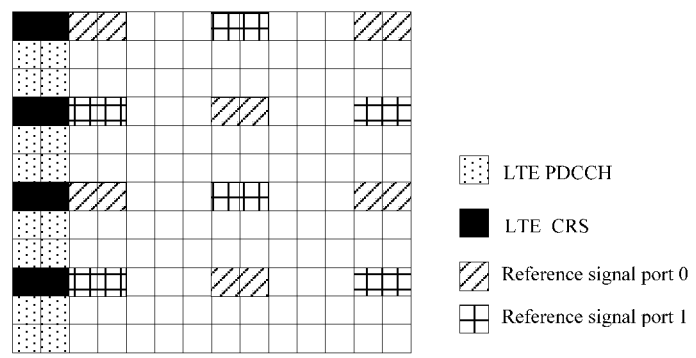
FIG. 12 ( b )
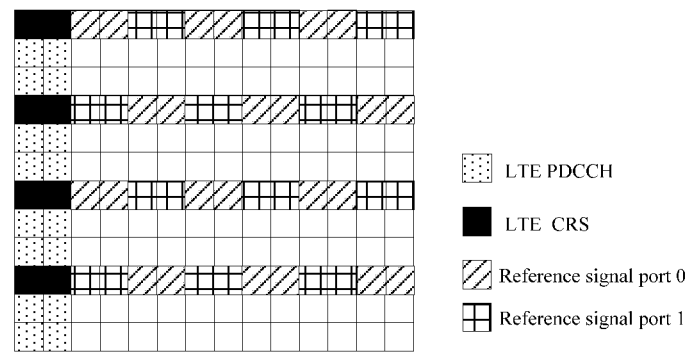
FIG. 12 ( c )

Basic-pattern example of a single-port reference signal

Basic-pattern example of a dual-port reference signal

Signal sending apparatus

Spreading unit 1801

Sending unit 1802

FIG. 18

Signal sending apparatus

Receiving unit 1901

FIG. 19

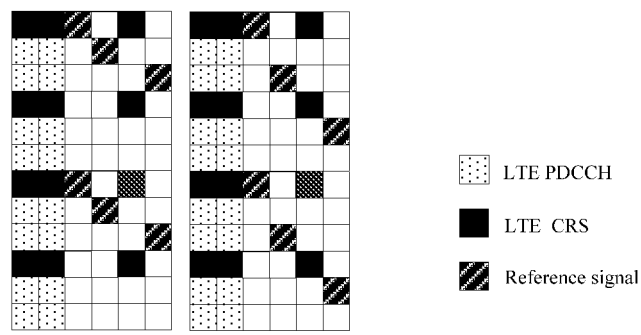
Basic-pattern example of a single-port reference signal
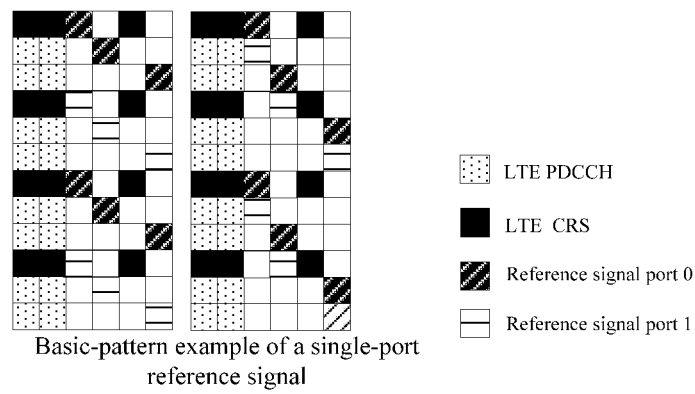
Basic-pattern example of a single-port reference signal
FIG. 22

SIGNAL SENDING METHOD AND APPARATUS, SIGNAL RECEIVING METHOD AND APPARATUS, AND COMPUTER STORAGE MEDIUM

CROSS-REFERENCE TO RELATED APPLICATIONS

This application is a U.S. National Stage Application, filed under 35 U.S.C. 371, of International Patent Application No. PCT/CN2018/108381, filed on Sep. 28, 2018, which claims priority to a Chinese patent application No. 201711147938.6 filed on Nov. 17, 2017, disclosure of which are incorporated herein by reference in their entireties.

TECHNICAL FIELD

The present application relates to the technical field of wireless communications and, in particular, relates to a signal sending method, a signal sending apparatus and a computer storage medium.

BACKGROUND

In order to meet the requirements of cellular Internet of Things, a narrow band Internet of Things (NB-IoT) access system is supported in the Rel-13 protocol version organized and released by the 3rd Generation Partnership Project (3GPP). In the subsequent Rel-14 protocol version, the NB-IoT system is enhanced in functions including positioning, multicasting, delay reduction, power consumption reduction, and enhanced non-anchor carrier operation. To support a wider range of Internet of Things applications and deployment scenarios, the NB-IoT system will continue to be enhanced in Rel-15 and later protocol versions.

In the NB-IoT system, a sequence reference signal (hereinafter simply referred to as a reference signal) is mainly used for signal measurement and data demodulation of a terminal, and since the NB-IoT system has a small bandwidth, for example, the length of a reference signal (RS) sequence is merely 2, and the reference signal sequence in each subframe are the same. For the cells of the same-frequency networking, data of the adjacent cell may cause interference to the reference signal, the reference signal may also cause interference to the data of the adjacent cell, and the inter-cell interference will affect the measurement performance and demodulation performance of the system.

SUMMARY

In order to solve the above-mentioned technical problems, the embodiments of the present application provide a signal sending method, a signal sending apparatus and a computer storage medium, which can optimize sending of a reference signal and a data signal so as to improve the measurement performance and demodulation performance of an NB-IoT system.

A signal sending method provided by an embodiment of the present application includes the steps described below:
configuration information of a reference signal is sent;
the reference signal is sent according to the configuration information.

A signal receiving method provided by an embodiment of the present application includes the steps described below:
configuration information of a reference signal is received;
the reference signal is received according to the configuration information.

A signal sending method provided by an embodiment of the present application includes the steps described below:
a code word is mapped and spread on a preset number of subframes or resource units to be sent.

A signal receiving method provided by an embodiment of the present application includes the steps described below:
a spread and mapped code word is received on a preset number of subframes or resource units.

A signal sending apparatus provided by an embodiment of the present application includes a configuration information sending unit and a reference signal sending unit.

The configuration information sending unit is configured to send configuration information of a reference signal.

The reference signal sending unit is configured to send the reference signal according to the configuration information.

A signal receiving apparatus provided by an embodiment of the present application includes a configuration information receiving unit and a reference signal receiving unit.

The configuration information receiving unit is configured to receive configuration information of a reference signal.

The reference signal receiving unit is configured to receive the reference signal according to the configuration information.

A signal sending apparatus provided by an embodiment of the present application includes an spreading unit and a sending unit.

The spreading unit is configured to map and spread a code word on a preset number of subframes or resource units.

The sending unit is configured to send the code word mapped and spread on the preset number of subframes or resource units.

A signal receiving apparatus provided by an embodiment of the present application includes a receiving unit.

The receiving unit is configured to receive a spread and mapped code word on a preset number of subframes or resource units.

A computer storage medium provided by an embodiment of the present application stores computer programs for implementing the above signal sending method or signal receiving method when the computer programs are executed by a processor.

According to the technical solution of the embodiment of the present application, the reference signal is sent on the idle invalid subframe, the reference signal is offset in time domain and frequency domain, the terminal performs measurement based on the cell-specific reference signal on the invalid subframe, and the measurement performance is greatly improved due to no interference of data from other users; the terminal can improve demodulation performance by using a user-specific reference signal sent on the invalid subframe. In a guard band mode, the reference signal is sent in a downlink timeslot of a special subframe which is not used for downlink data transmission so that the measurement or demodulation performance can be improved; through code word mapping and spread, the code rate can be further reduced, and mutual interference between adjacent cells when data is sent can be reduced; no data is sent on the muting resource element, so that mutual interference between reference signals and data of adjacent cells can be reduced.

BRIEF DESCRIPTION OF DRAWINGS

The drawings generally illustrate various embodiments discussed herein by way of examples rather than limitations.

FIG. 7 is a flowchart 2 of a signal sending method according to an embodiment of the present application;

FIG. 8 is a flowchart 2 of a signal receiving method according to an embodiment of the present application;

FIG. 9 is a schematic diagram 5 of a reference signal pattern according to an embodiment of the present application;

FIG. 10(a) is a schematic diagram 6 of a reference signal pattern according to an embodiment of the present application;

FIG. 10(b) is a schematic diagram 7 of a reference signal pattern according to an embodiment of the present application;

FIG. 18 is a structural diagram 2 of a signal sending apparatus according to an embodiment of the present application;

FIG. 19 is a structural diagram 2 of a signal receiving apparatus according to an embodiment of the present application;

FIG. 22 is a schematic diagram 20 of a reference signal pattern according to an embodiment of the present application.

DETAILED DESCRIPTION

To provide a more detailed understanding of features and technical content of embodiments of the present application, the implementation of the embodiments of the present application is described below in detail in conjunction with the drawings. The drawings are provided for reference only and are not intended to limit the embodiments of the present application.

The following is an illustration of key terms involved in embodiments of the present application.

| Abbreviation | Full Name |
| --- | --- |
| NB-IoT | Narrowband-Internet of Things |
| RE | Resource element |
| RU | Resource Unit |
| OFDM | Orthogonal Frequency Division Multiplexing |
| NPDCCH | Narrowband physical downlink control channel |
| NPDSCH | Narrowband physical downlink shared channel |
| NPUSCH | Narrowband physical uplink shared channel |
| DCI | Downlink control information |
| RRC | Radio resource control |
| NRS | Narrowband Reference signal |
| MBSFN | Multicast Broadcast Single Frequency Network |
| TDD | Time Division Duplexing |
| MCS | Modulation and Coding Scheme |
| OCC | Orthogonal Cover Code |

Figure 1:
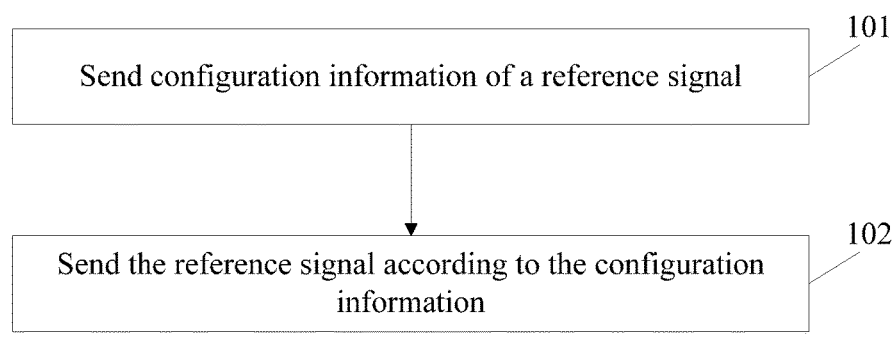
FIG. 1 is a flowchart 1 of a signal sending method according to an embodiment of the present application.

FIG. 1 is a flowchart 1 of a signal sending method according to an embodiment of the present application. As shown in FIG. 1, the signal sending method includes the steps described below.

In step 101, configuration information of a reference signal is sent.

In step 102, the reference signal is sent according to the configuration information.

In the embodiment of the present application, the reference signal includes at least one of: a cell-specific reference signal or a user-specific reference signal.

In the embodiment of the present application, a position of the reference signal in time domain and/or frequency domain is determined based on a cell identifier.

In the embodiment of the present application, the step of sending the configuration information of the reference signal includes: sending the configuration information of the reference signal through user-specific radio resource control (RRC) signaling or a system message.

In the embodiment of the present application, the configuration information includes at least one of the following parameters: position information of subframe(s) carrying the reference signal, a transmission period, a transmission interval, information about a time domain position within the subframe, information about a frequency domain position within the subframe, or a sequence number of a basic pattern of the reference signal.

In the embodiment of the present application, the configuration information includes operation mode and special subframe configuration information.

1) If the operation mode is a guard band mode and a downlink timeslot of the special subframe includes N downlink symbols, the reference signal is sent on the N downlink symbols.

2) If the operation mode is an inband mode and a downlink timeslot of the special subframe includes H downlink symbols, the reference signal is sent on T downlink symbols among the H downlink symbols, where T is less than H.

In the embodiment of the present application, the configuration information includes muting indication information; and when the muting indication information indicates muting, a resource element other than a resource element on which the reference signal is located on the OFDM symbol sending the reference signal is a muting resource element, where no data is mapped or sent on the muting resource element.

In the embodiment of the present application, a subframe carrying the reference signal includes an invalid subframe. The invalid subframe refers to a subframe not sending a data signal. The data signal includes a common signal and single-user data; the common signal includes at least: a synchronization signal, a broadcast message, and a system message.

In the embodiment of the present application, the step of determining the position of the reference signal in time domain and/or frequency domain based on the cell identifier includes one of the following:

performing a modulo operation on the cell identifier and a first preset value to obtain a first remainder; and determining the position of the reference signal in frequency domain based on the first remainder;

dividing the cell identifier by the first preset value, and performing a modulo operation on a calculation result of the dividing and a second preset value to obtain a second remainder; and determining the position of the reference signal in frequency domain based on the first remainder and determining the position of the reference signal in time domain based on the second remainder; or dividing the cell identifier by the first preset value, and performing the modulo operation on the calculation result of the dividing and the second preset value to obtain the second remainder; and determining the position of the reference signal in frequency domain based on the second remainder and determining the position of the reference signal in time domain based on the first remainder.

The above-mentioned modulo operation and calculation operation merely characterize how to obtain the first remainder and the second remainder through the cell identifier, and the specific implementation can be performed in various manners, such as table mapping, where as long as the actual result obtained from the table mapping is the same as the result obtained from the modulo operation and calculation operation of the present application, the table mapping is also within the scope of protection of the present application.

In the embodiment of the present application, the first preset value is an integer multiple of 3, and the second preset value is an integer multiple of 2; or the first preset value is an integer multiple of 2, and the second preset value is an integer multiple of 3.

In the embodiment of the present application, for an inband mode, the reference signal is located, in time domain, on an OFDM symbol on which cell reference signal (CRS) is not located.

In the embodiment of the present application, the time domain position of the reference signal is determined according to a CRS included on a non-physical downlink control channel (PDCCH) symbol on a subframe transmitting the reference signal, where the non-PDCCH symbol refers to an OFDM symbol on which PDCCH is not located.

In the embodiment of the present application, for a guard band mode and a standalone mode, an identical port of the reference signal occupies two consecutive symbols in time domain.

In the embodiment of the present application, the method further includes a step described below:

a sequence of the reference signal includes an orthogonal cover code sequence and a pseudo-random sequence, and the orthogonal cover code sequence and the pseudo-random sequence are determined according to a cell identifier; or the sequence of the reference signal includes a pseudo-random sequence, and the pseudo-random sequence is determined according to the cell identifier.

In the embodiment of the present application, the method further includes a step described below:

the orthogonal cover code (OCC) sequence is selected according to the following formula: floor(cell identifier/(X× Y)) mod Z; Y is an integer multiple of 1 or 2, X is an integer multiple of 1 or 3, and Z is a quantity of OCC sequences.

Figure 2:
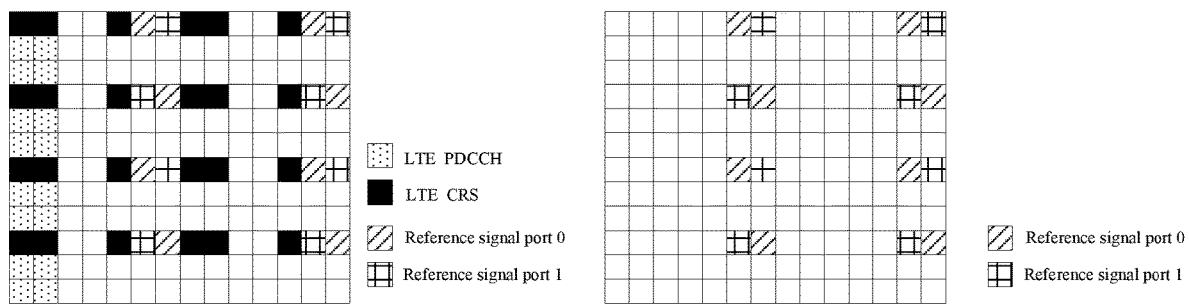
FIG. 2 is a schematic diagram 1 of a reference signal pattern according to an embodiment of the present application.
Figure 3:
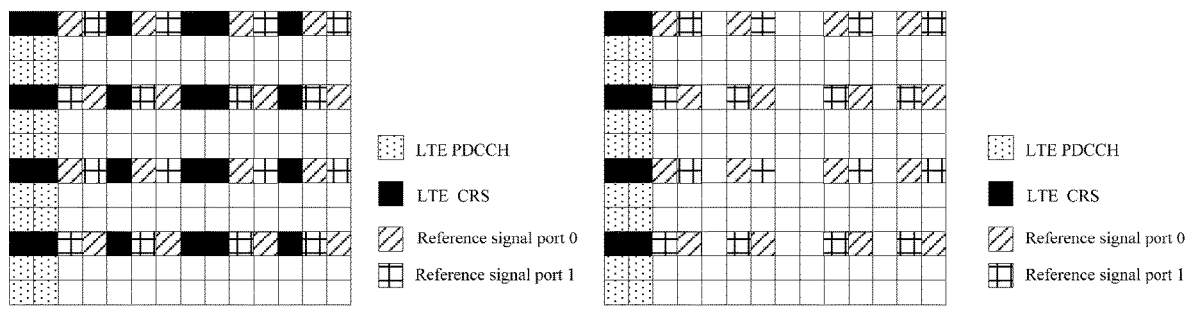
FIG. 3 is a schematic diagram 2 of a reference signal pattern according to an embodiment of the present application.

In specific applications, the position of the reference signal in time domain and/or frequency domain may be characterized by a pattern of the reference signal. For example, pattern offset processing is performed on the basic pattern of the reference signal based on the cell identifier to obtain a pattern of the reference signal, as shown in FIG. 2. As shown in FIG. 3, whether the reference signal is sent on symbols #2 and #3 is determined by the specific number of symbols occupied by the PDCCH.

Figure 4:
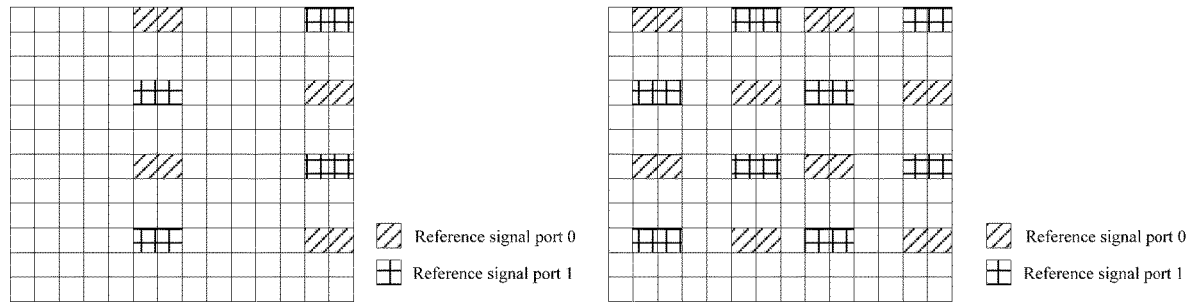
FIG. 4 is a schematic diagram 3 of a reference signal pattern according to an embodiment of the present application.
Figure 6:
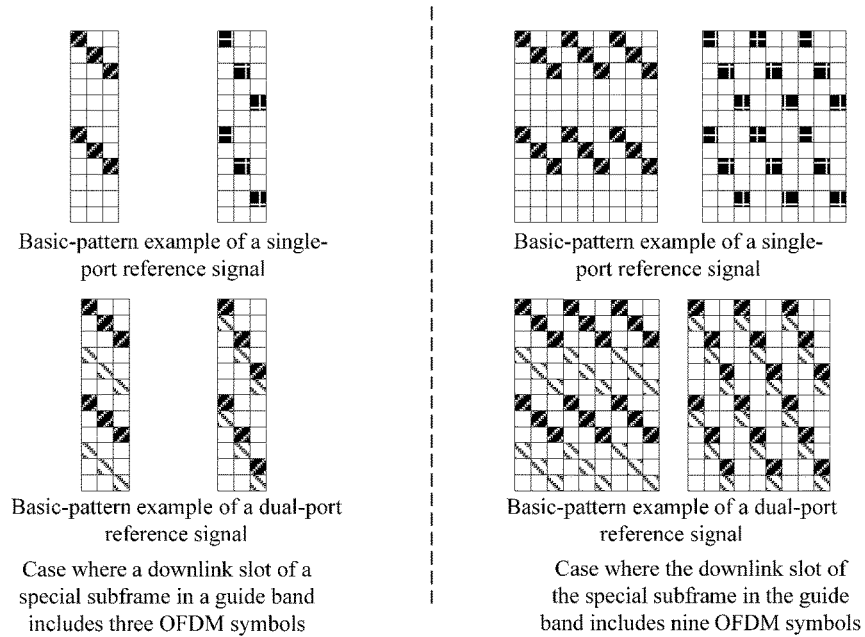
FIG. 6 is a schematic diagram 4 of a reference signal pattern according to an embodiment of the present application.
Figure 20:
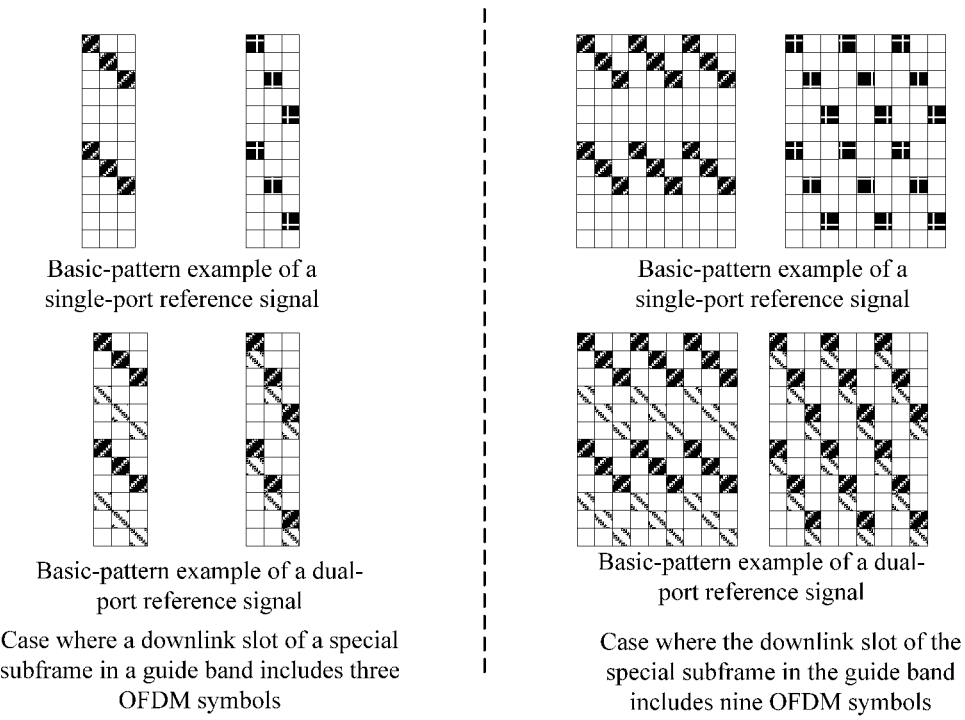
FIG. 20 is a schematic diagram 18 of a reference signal pattern according to an embodiment of the present application.
Figure 21:
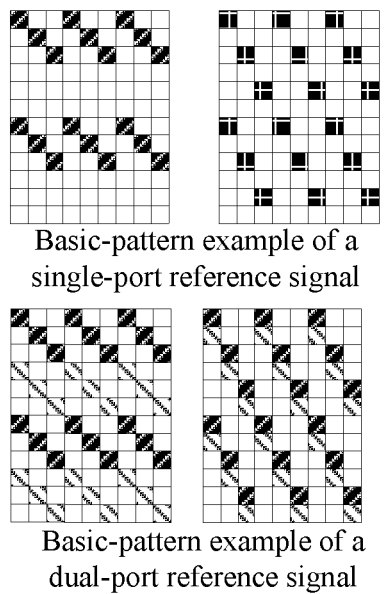
FIG. 21 is a schematic diagram 19 of a reference signal pattern according to an embodiment of the present application.

In the embodiment of the present application, as shown in FIG. 4, reference signals in different cells are orthogonally spread through an OCC sequence. FIG. 6 shows several reference signal patterns. FIG. 20 shows patterns in a case where a downlink timeslot of a special subframe in a guard band includes three OFDM symbols and in a case where the downlink timeslot of the special subframe in the guard band includes nine OFDM symbols. FIG. 21 shows basic patterns of single-port and dual-port reference signals. FIG. 22 shows patterns when a downlink timeslot of a special subframe includes six downlink OFDM symbols (in an inband mode).

Figure 5:
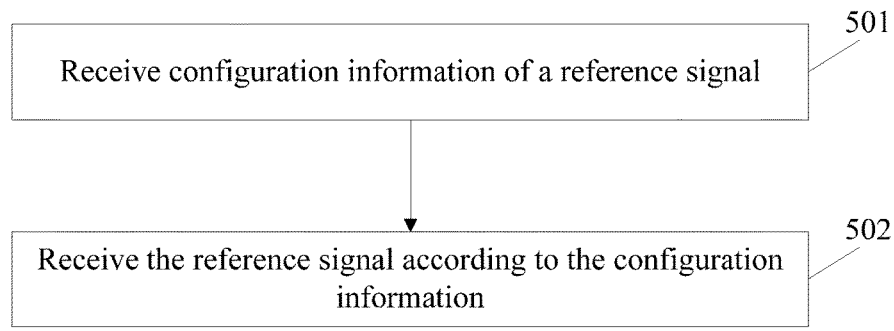
FIG. 5 is a flowchart 1 of a signal receiving method according to an embodiment of the present application.

FIG. 5 is a flowchart 1 of a signal receiving method according to an embodiment of the present application. As shown in FIG. 5, the signal receiving method includes the steps described below.

In step 501, configuration information of a reference signal is received.

In step 502, the reference signal is received according to the configuration information.

In the embodiment of the present application, the reference signal includes at least one of: a cell-specific reference signal or a user-specific reference signal.

In the embodiment of the present application, the method further includes a step described below:

a position of the reference signal in time domain and/or frequency domain is determined based on a cell identifier.

In the embodiment of the present application, the configuration information includes at least one of the following parameters: position information of a subframe carrying the reference signal, a transmission period, a transmission interval, information about a time domain position within the subframe, information about a frequency domain position within the subframe, or a sequence number of a basic pattern of the reference signal.

In the embodiment of the present application, the configuration information includes operation mode and special subframe configuration information.

1) If the operation mode is a guard band mode and a downlink timeslot of the special subframe includes N downlink symbols, the reference signal is received on the N downlink symbols.

2) If the operation mode is an inband mode and a downlink timeslot of the special subframe includes H downlink symbols, the reference signal is received on T downlink symbols among the H downlink symbols, where T is less than H.

In the embodiment of the present application, the configuration information includes muting indication information; and when the muting indication information indicates muting, a resource element other than a resource element on which the reference signal is located on the OFDM symbol sending the reference signal is a muting resource element, where no data is mapped or sent on the muting resource element.

In the embodiment of the present application, a subframe carrying the reference signal includes an invalid subframe. The invalid subframe refers to a subframe not sending a data signal. The data signal includes a common signal and single-user data; the common signal includes at least: a synchronization signal, a broadcast message, and a system message.

In the embodiment of the present application, the step of determining the position of the reference signal in time domain and/or frequency domain based on the cell identifier includes one of the following:
  performing a modulo operation on the cell identifier and a first preset value to obtain a first remainder; and determining the position of the reference signal in frequency domain based on the first remainder;
  dividing the cell identifier by the first preset value, and performing a modulo operation on a calculation result of the dividing and a second preset value to obtain a second remainder; and determining the position of the reference signal in frequency domain based on the first remainder and determining the position of the reference signal in time domain based on the second remainder; or
  dividing the cell identifier by the first preset value, and performing the modulo operation on the calculation result of the dividing and the second preset value to obtain the second remainder; and determining the position of the reference signal in frequency domain based on the second remainder and determining the position of the reference signal in time domain based on the first remainder.

The above-mentioned modulo operation and calculation operation merely characterize how to obtain the first remainder and the second remainder through the cell identifier, and the specific implementation can be performed in various manners, such as table mapping, where as long as the actual result obtained from the table mapping is the same as the result obtained from the modulo operation and calculation operation of the present application, the table mapping is also within the scope of protection of the present application.

In the embodiment of the present application, the first preset value is an integer multiple of 3, and the second preset value is an integer multiple of 2; or the first preset value is an integer multiple of 2, and the second preset value is an integer multiple of 3.

In the embodiment of the present application, for an inband mode, the reference signal received on an invalid subframe is located, in time domain, on an OFDM symbol on which CRS is not located.

In the embodiment of the present application, a time domain position of the reference signal is determined according to a CRS included on a non-PDCCH symbol on a subframe transmitting the reference signal, where the non-PDCCH symbol refers to an OFDM symbol on which PDCCH is not located.

In the embodiment of the present application, for a guard band mode and a standalone mode, an identical port of the reference signal occupies two consecutive symbols in time domain.

In the embodiment of the present application, the method further includes a step described below:
  a sequence of the reference signal includes an orthogonal cover code sequence and a pseudo-random sequence, and the orthogonal cover code sequence and the pseudo-random sequence are determined according to a cell identifier; or the sequence of the reference signal includes a pseudo-random sequence, and the pseudo-random sequence is determined according to the cell identifier.

In the embodiment of the present application, the method further includes a step described below:
  the orthogonal cover code (OCC) sequence is selected according to the following formula: floor(cell identifier/(X× Y)) mod Z; Y is an integer multiple of 1 or 2, X is an integer multiple of 1 or 3, and Z is a quantity of OCC sequences.

FIG. 7 is a flowchart 2 of a signal sending method according to an embodiment of the present application. As shown in FIG. 7, the signal sending method includes a step described below.

In step 701, a code word is mapped and spread on a preset number of subframes or resource units for sending the mapped and spread code word.

In the embodiment of the present application, the preset number is 2N or $2^n \times N$, where N is the number of subframes or resource units indicated by resource allocation in downlink control information, and n is an integer greater than 1.

In the embodiment of the present application, in response to determining that a data coding code rate is greater than a first threshold and/or that the number of data sending repetitions is greater than a second threshold, the code word is mapped and spread on the preset number of subframes or resource units.

Alternatively, in response to determining that a value of modulation and coding signaling is greater than a third threshold and that the number of data sending repetitions is greater than the second threshold, the code word is mapped and spread on the preset number of subframes or resource units.

Alternatively, in response to determining that the data coding code rate is greater than the first threshold, the code word is mapped and spread on the preset number of subframes or resource units.

Alternatively, in response to determining that the value of the modulation and coding signaling is greater than the third threshold, the code word is mapped and spread on the preset number of subframes or resource units.

In the embodiment of the present application, the first threshold or the second threshold is configured through signaling; or the first threshold or the second threshold is determined in a preset manner.

FIG. 8 is a flowchart 2 of a signal receiving method according to an embodiment of the present application. As shown in FIG. 8, the signal receiving method includes a step described below.

In step 801, a spread and mapped code word is received on a preset number of subframes or resource units.

In the embodiment of the present application, the preset number is 2N or $2^n \times N$, where N is the number of subframes or resource units indicated by resource allocation in downlink control information, and n is an integer greater than 1.

In the embodiment of the present application, the method further includes a step described below:

in response to determining that a data coding code rate is greater than a first threshold and that the number of data sending repetitions is greater than a second threshold, the code word is mapped and spread on the preset number of subframes or resource units; or in response to determining that a value of modulation and coding signaling is greater than a third threshold and that the number of data sending repetitions is greater than the second threshold, the code word is mapped and spread on the preset number of subframes or resource units; or in response to determining that the data coding code rate is greater than the first threshold, the code word is mapped and spread on the preset number of subframes or resource units; or in response to determining that the value of the modulation and coding signaling is greater than the third threshold, the code word is mapped and spread on the preset number of subframes or resource units.

In the embodiment of the present application, the first threshold or the second threshold is configured through signaling; or the first threshold or the second threshold is determined in a preset manner.

The technical solutions provided by the embodiments of the present application will be further described below in detail in conjunction with specific application examples.

APPLICATION EXAMPLE ONE

The example is mainly used for configuring a data muting mode to reduce inter-cell interference.

(1) The data muting mode is configured for a UE through user-specific RRC configuration signaling. The user-specific RRC configuration signaling includes fields as shown in Table 1 or Table 2.

TABLE 1

| | |
|---|---|
| 0 | a symbol where a reference signal is located is not data-muted |
| 1 | the symbol where the reference signal is located is data-muted (power boosting is not performed on the reference signal) |

TABLE 2

| | |
|---|---|
| 00 | a symbol where a reference signal is located is not data-muted |
| 01 | the symbol where the reference signal is located is data-muted, and power boosting is performed on the reference signal |
| 10 | the symbol where the reference signal is located is data-muted, and power boosting is not performed on the reference signal |
| 11 | Reserved |

In the data muting mode, resource elements other than resource elements where reference signals are located on OFDM symbols where narrowband reference signals (NRS) are located are set as muting resource elements; and no data is mapped or sent on the muting resource elements, as shown in FIG. 9.

(2) The UE receives a unicast control channel (NPDCCH in unicast search space (USS)) and/or a downlink data channel (NPDSCH) according to the data muting mode after receiving RRC configuration signaling of the data muting mode.

APPLICATION EXAMPLE TWO

The example is mainly used for configuring a code word mapping and spread mode to reduce inter-cell interference.

(1) The code word mapping and spread mode is configured for a UE through user-specific RRC signaling. The user-specific RRC configuration signaling includes fields as shown in Table 3.

TABLE 3

| | |
|---|---|
| 0 | No rate matching spread/no code word mapping and spread |
| 1 | Rate matching spread/code word mapping and spread |

In an interference cancellation enhancement mode, when data is sent repeatedly (repetition), the code word is mapped and spread on $2N_{SF}$ or $(2^n \times N_{SF})$ subframes according to the number of repetitions, that is, rate matching is performed on $2N_{SF}$ or $(2^n \times N_{SF})$ subframes, where $N_{SF}$ is the number of subframes indicated by resource allocation in downlink control information. N is an integer greater than 1. Code word mapping and spread is enabled when the coding code rate is greater than a threshold or when the number of repetitions is greater than a threshold; the threshold of the coding code rate or the threshold of the number of repetitions may be predefined or configured through RRC signaling or configured through DCI or implicitly indicated by information in the DCI.

For example, the threshold of the coding code rate is 1, and the threshold of the number of repetitions is 2 or 4; or the threshold of the coding code rate may be determined implicitly according to a modulation and coding scheme (MCS) field in the DCI, such as MCS=3 as the threshold of the coding code rate.

The code word mapping and spread mode configuration is determined according to the UE version or capability; for legacy UEs, no code word mapping and spread mode configuration is performed.

(2) The UE receives a unicast control channel (NPDCCH in unicast search space (USS)) and/or a downlink data channel (NPDSCH) according to the code word mapping and spread mode after receiving RRC configuration signaling of the code word mapping and spread.

APPLICATION EXAMPLE THREE

The example is mainly used for configuring in an NB-IoT embedded LTE operation mode (i.e., inband mode) a reference signal to be sent on an invalid subframe so as to reduce inter-cell interference.

(1) The reference signal is configured, through a system message or user-specific RRC signaling, to be sent on an invalid subframe.

Here, the reference signal is sent on an invalid subframe. The reference signal includes a cell-specific reference signal and/or a user-specific reference signal. The pattern of the reference signal (i.e., the position of the reference signal in time domain and/or frequency domain) is related to the cell identifier. The invalid subframe is an idle invalid subframe. The idle invalid subframe refers to a subframe which is not used for sending a common signal such as a synchronization signal, a broadcast message, or a system message and which is configured as an invalid subframe. The reference signal may be configured through user-specific RRC signaling or a system information block (SIB) to be sent on an invalid subframe. The configuration information sent in the system message or in the user-specific RRC signaling includes configuration information for sending the reference signal. The configuration information for sending the reference signal includes at least one of the following parameters: the position of a subframe, a transmission period, a transmission interval, a time-domain offset value, a frequency-domain offset value, or a sequence number of a basic pattern of the reference signal.

If a cell-specific reference signal is located in the invalid subframe, the NRS reference signal pattern is obtained from pattern offset of the basic pattern in FIG. 10(a) in time domain and frequency domain according to the cell identifier, i.e., the specific NRS reference signal pattern is determined according to the cell identifier. The frequency domain offset of the reference signal pattern is performed according to the cell identifier mod X in the frequency domain, and the time domain offset of the reference signal pattern is performed according to the (cell identifier/X) mod Y in the time domain. X is 3 or 6, and Y may be selected to be 2. When (cell identifier/X) mod Y=0, the time domain position of the reference signal is the same as the time domain position in the basic pattern of FIG. 10(a). When (cell identifier/X) mod Y=1, the time domain position of the reference signal is the same as the time domain position in the pattern of FIG. 10(b).

In an embodiment, the port of the narrowband reference signal sent on the invalid subframe may be the same as or different from the existing port of the narrowband reference signal.

In an embodiment, the sequence of the reference signal reuses an LTE CRS sequence, the length of the reference sequence is 2 and the reference sequence is a truncated sequence of the LTE CRS sequence.

APPLICATION EXAMPLE FOUR

The example is mainly used for configuring in an NB-IoT embedded LTE operation mode (i.e., inband mode) a sending pattern of a reference signal to be sent on an invalid subframe.

If the reference signal is configured to be sent on the invalid subframe, the reference signal sent on the invalid subframe is located, in time domain, on the OFDM symbol on which CRS is not located. Offset is performed based on the basic pattern in frequency domain according to the cell identifier, i.e., the specific position of the reference signal in frequency domain is determined according to the cell identifier. Frequency domain offset of a reference signal pattern is performed in frequency domain according to the cell identifier mod X, where X is 3 or 6.

In an embodiment, the basic pattern of a reference signal may be determined according to a case of inclusion of a CRS on a non-PDCCH symbol in an invalid subframe. To ensure demodulation or measurement performance, the reference signals are sent on as many OFDM symbols as possible, as shown in FIG. 11(a) or FIG. 11(b).

Figure 11:
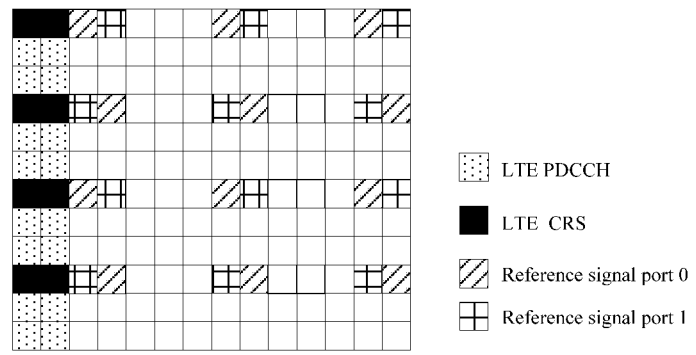
FIG. 11(a) is a schematic diagram 8 of a reference signal pattern according to an embodiment of the present application.
FIG. 11(b) is a schematic diagram 9 of a reference signal pattern according to an embodiment of the present application.
FIG. 11(c) is a schematic diagram 10 of a reference signal pattern according to an embodiment of the present application.
FIG. 11(d) is a schematic diagram 11 of a reference signal pattern according to an embodiment of the present application.
Figure 11:
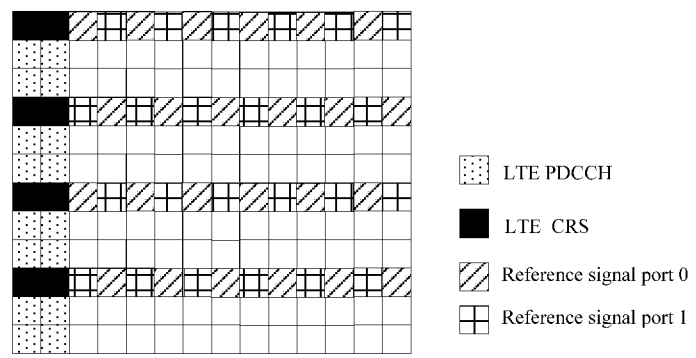

In an embodiment, for the basic pattern of a reference signal on non-PDCCH symbols on which CRS is not located in an invalid subframe, the distribution of the reference signal in the time domain is characterized in that the reference signal is equally spaced or uniformly distributed on symbols other than PDCCH symbols, as shown in FIG. 11(c).

In an embodiment, for the basic pattern of a reference signal on non-PDCCH symbols on which CRS is not located in an invalid subframe, the distribution of the reference signal in the time domain is characterized in that the reference signal is sent on as many OFDM symbols as possible to ensure demodulation or measurement performance, as shown in FIG. 11(d).

Whether the reference signal is sent on symbols #2 and #3 is determined by the specific number of symbols occupied by the PDCCH.

In an embodiment, the sequence of the reference signal reuses an LTE CRS sequence, the length of the reference sequence is 2 and the reference sequence is a truncated sequence of the LTE CRS sequence.

In an embodiment, the port of the narrowband reference signal sent on the invalid subframe may be the same as or different from the existing port of the narrowband reference signal.

The idle invalid subframe refers to a subframe which is not used for sending a common signal such as a synchronization signal, a broadcast message, or a system message.

APPLICATION EXAMPLE FIVE

The example is mainly used for configuring in an NB-IoT embedded LTE operation mode (i.e., inband mode) a sending pattern of a reference signal to be sent on an invalid subframe.

If the reference signal is configured to be sent in an invalid subframe, the position of the NRS reference signal pattern in the time domain is on an OFDM symbol on which CRS is not located, and an identical port of the NRS reference signal occupies two consecutive symbols in time domain; and pattern offset is performed in frequency domain according to the cell identifier, i.e., the specific position of the NRS reference signal in the frequency domain is determined according to the cell identifier. Frequency domain offset of a reference signal pattern is performed in a frequency domain according to the cell identifier mod X, where X is 3 or 6.

Figure 12:
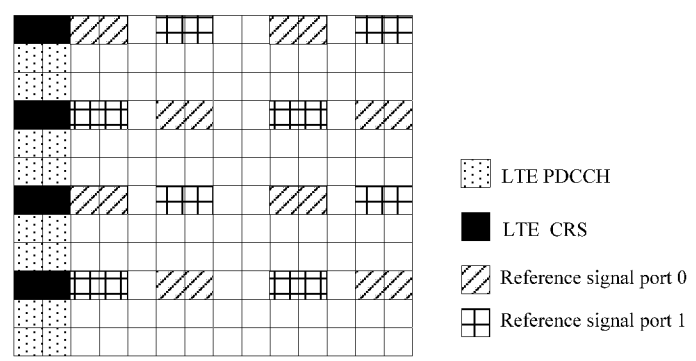
FIG. 12(a) is a schematic diagram 12 of a reference signal pattern according to an embodiment of the present application.
FIG. 12(b) is a schematic diagram 13 of a reference signal pattern according to an embodiment of the present application.
FIG. 12(c) is a schematic diagram 14 of a reference signal pattern according to an embodiment of the present application.

In an embodiment, the basic pattern is as shown in FIG. 12(a) according to a case of inclusion of a CRS on a non-LTE PDCCH symbol in an invalid subframe.

In an embodiment, for the basic pattern of a reference signal on non-PDCCH symbols in an invalid subframe in which CRS is not located, the distribution of the reference signal in the time domain is characterized in that the reference signal is equally spaced or uniformly distributed on symbols other than PDCCH symbols, as shown in FIG. 12(b). Time domain offset of a reference signal pattern is performed in a time domain according to (cell identifier/X) mod Y, where y is 2 or 4 or 6 or 8 or 10 or 12.

In an embodiment, for the basic pattern of a reference signal on non-PDCCH symbols on which CRS is not located in an invalid subframe, the distribution of the reference signal in the time domain is characterized in that reference signal is sent on all OFDM symbols on which CRS is not located other than the PDCCH symbols, as shown in FIG. 12(c).

The reference signals in different cells are further subjected to orthogonal spread through an OCC sequence, and the OCC sequence is selected according to (cell identifier/(X×Y) mod Z (where Y is 1 if no time domain offset exists); Z=2; when (cell identifier/(X×Y) mod Z=0, the OCC sequence is [1 1]; when (cell identifier/(X×Y) mod Z=1, the OCC sequence is [1 −1].

In an embodiment, the port of the narrowband reference signal sent on the invalid subframe may be the same as or different from the existing port of the narrowband reference signal.

In an embodiment, the sequence of the reference signal reuses an LTE CRS sequence, the length of the reference sequence is 2 and the reference sequence is a truncated sequence of the LTE CRS sequence.

APPLICATION EXAMPLE SIX

The example is mainly used for configuring a sending pattern of a reference signal on an invalid subframe in an NB-IoT guard band mode or a standalone mode.

If the reference signal is configured to be sent on an invalid subframe, the NRS reference signal occupies 4 or 6 or 8 or 12 or 14 symbols in time domain, as shown in FIG. 13, and pattern offset is performed in the frequency domain according to a cell identifier (ID), i.e., a specific NRS reference signal pattern is determined according to the cell ID. Frequency domain offset of a reference signal pattern is performed in a frequency domain according to the cell ID mod X, where X is 3 or 6.

Figure 13A:
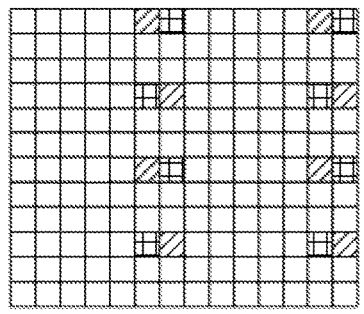
FIG. 13(a)-FIG. 13(e) schematically show a reference signal pattern according to an embodiment of the present application.
Figure 13B:
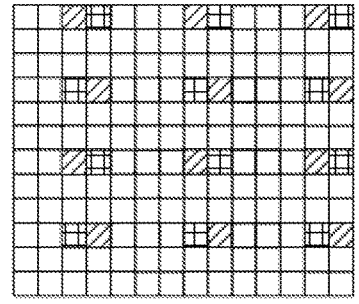
Figure 13C:
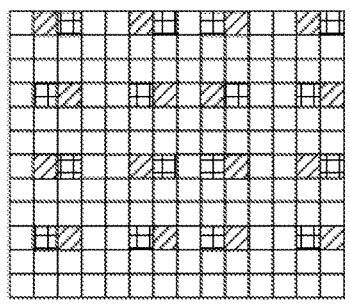
Figure 13D:
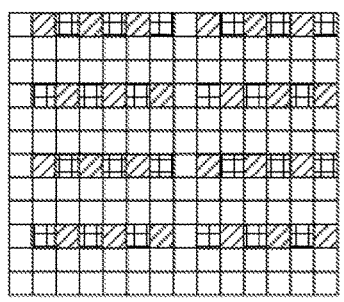
Figure 13E:
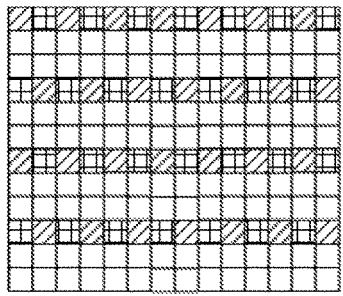

For the case where the NRS reference signal occupies 4 or 6 or 8 symbols in time domain, as shown in FIG. 13(a), FIG. 13(b) or FIG. 13(c), time domain offset of the reference signal pattern is performed according to (cell ID/X) mod Y in the time domain, where y is 2 or 4 or 6 or 8 or 10 or 12.

In an embodiment, the port of the narrowband reference signal sent on the invalid subframe may be the same as or different from the existing port of the narrowband reference signal.

In an embodiment, the sequence of the reference signal reuses an LTE CRS sequence, the length of the reference sequence is 2 and the reference sequence is a truncated sequence of the LTE CRS sequence.

The idle invalid subframe refers to a subframe which is not used for sending a common signal such as a synchronization signal, a broadcast message, or a system message.

APPLICATION EXAMPLE SEVEN

The example is mainly used for configuring another sending pattern of a reference signal on an invalid subframe in an NB-IoT guard band mode or a standalone mode.

If the reference signal is configured to be sent on an invalid subframe, an identical port of the NRS reference signal occupies two consecutive symbols in time domain, as shown in FIG. 14, and pattern offset is performed in frequency domain according to a cell ID, i.e., a specific NRS reference signal pattern is determined according to the cell ID. Frequency domain offset of a reference signal pattern is performed in a frequency domain according to the cell ID mod X, where X is 3 or 6.

Figure 14A:
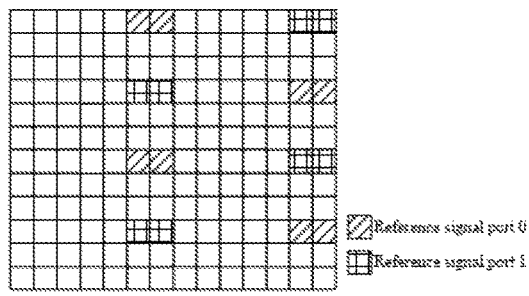
FIG. 14(a)-FIG. 14(e) schematically show a reference signal pattern according to an embodiment of the present application.
Figure 14B:
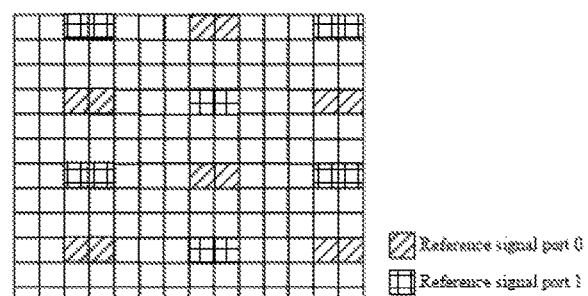
Figure 14C:
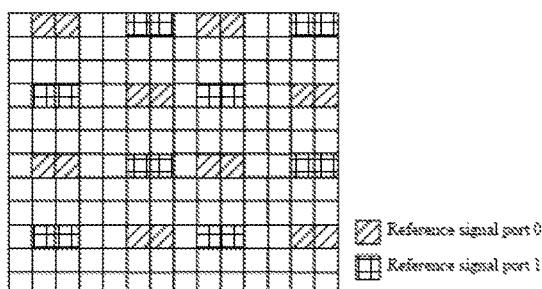
Figure 14D:
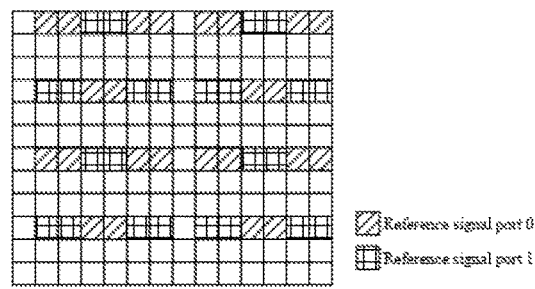
Figure 14E:
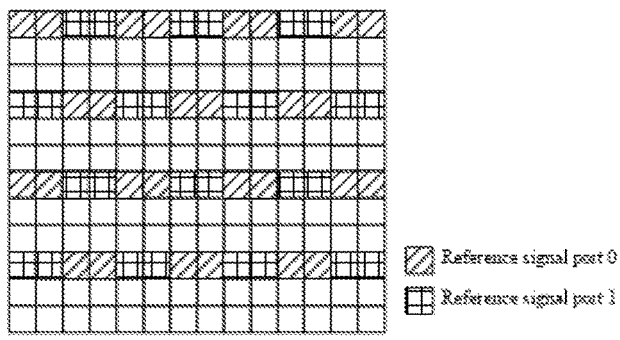

For the case where the NRS reference signal occupies 4 or 6 or 8 symbols in the time domain, as shown in FIG. 14(a), FIG. 14(b) or FIG. 14(c), time domain offset of the reference signal pattern is performed according to (cell ID/X) mod Y in time domain, where X is 3 or 6, and Y is 2 or 4 or 6 or 8.

The reference signals in different cells are further subjected to orthogonal spread through an OCC sequence, and the OCC sequence is selected according to (cell ID/(X×Y) mod Z; Z=2; when (cell ID/(X×Y) mod Z=0 (where Y is 1 if no time domain offset exists), the OCC sequence is [1 1]; when (cell ID/(X×Y) mod Z=1, the OCC sequence is [1 −1].

In an embodiment, the port of the narrowband reference signal sent on the invalid subframe may be the same as or different from the existing port of the narrowband reference signal.

The idle invalid subframe refers to a subframe which is not used for sending a common signal such as a synchronization signal, a broadcast message, or a system message.

APPLICATION EXAMPLE EIGHT

The example is mainly used for configuring a reference signal special subframe sending mode to reduce inter-cell interference.

(1) The reference signal special subframe sending mode is configured through a system message or user-specific RRC configuration signaling. The system message or the user-specific RRC configuration signaling includes fields as shown in Table 4.

TABLE 4

| | |
|---|---|
| 0 | Measurement reference signal not being sent on a special subframe |
| 1 | Measurement reference signal being sent on the special subframe |

Figure 15:
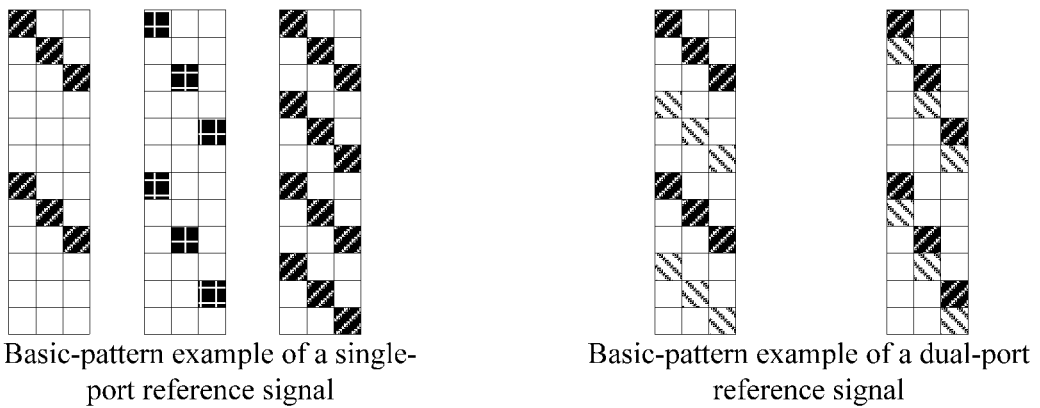
FIG. 15 is a schematic diagram 17 of a reference signal pattern according to an embodiment of the present application.

For the guard band mode of the time division duplexing (TDD) system, when a mode that the reference signal is sent on a special subframe is configured and in the reference signal special subframe sending mode, if the downlink timeslot in the special subframe includes merely three downlink symbols, the three symbols are used for sending the reference signal. Several patterns as shown in FIG. 15 may be used as reference signal basic patterns in the case where the downlink timeslot of the special subframe includes three downlink symbols. The specific pattern of the reference signal is obtained from pattern offset of the basic pattern in frequency domain according to the cell ID. The frequency domain offset of the reference signal pattern is performed in the frequency domain according to the cell ID mod Y, Y is an integer less than or equal to 6, and 6 or 3 is preferable according to the reference signal density in the pattern. For a single antenna port, Y is preferably 6 if two reference signal resource elements are included on one OFDM symbol and Y is preferably 3 if more than two reference signal resource elements are included on one OFDM symbol. For a single antenna port, the reference signal sequence on one OFDM symbol is formed by N elements in the center of the LTE CRS sequence, where N is the number of reference signal resource elements included on one OFDM symbol.

Reference signal special subframe sending mode configuration is determined according to the UE version or capability; for legacy UEs, no reference signal special subframe sending mode configuration is performed.

(2) After receiving the RRC configuration signaling of the reference signal special subframe sending mode configuration, the UE performs measurement according to the reference signal special subframe sending mode configuration through special subframe configuration information.

APPLICATION EXAMPLE NINE

For the guard band mode of the TDD system, if a downlink pilot timeslot (DwPTS) on a special subframe includes merely three downlink symbols, the three symbols are used for sending a reference signal.

Several patterns as shown in FIG. 15 may be used as reference signal basic patterns in the case where the downlink timeslot of the special subframe includes three downlink symbols. The specific pattern of the reference signal is obtained from pattern offset of the basic pattern in the frequency domain according to the cell ID. The frequency domain offset of the reference signal pattern is performed in frequency domain according to the cell ID mod Y, Y is an integer less than or equal to 6, and 6 or 3 is preferable according to the reference signal density in the pattern. For a single antenna port, Y is preferably 6 if two reference signal resource elements are included on one OFDM symbol and Y is preferably 3 if more than two reference signal resource elements are included on one OFDM symbol. For a single antenna port, the reference signal sequence on one OFDM symbol is formed by N elements in the center of the LTE CRS sequence, where N is the number of reference signal resource elements included on one OFDM symbol.

Reference signal special subframe sending mode configuration is determined according to the UE version or capability; for legacy UEs, no reference signal special subframe sending mode configuration is performed.

Figure 16:
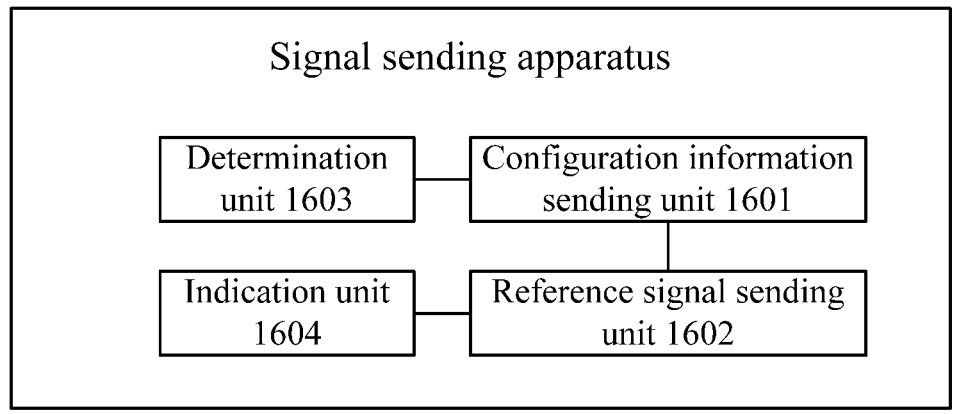
FIG. 16 is a structural diagram 1 of a signal sending apparatus according to an embodiment of the present application.

FIG. 16 is a structural diagram 1 of a signal sending apparatus according to an embodiment of the present application. As shown in FIG. 16, the apparatus includes a configuration information sending unit 1601 and a reference signal sending unit 1602.

The configuration information sending unit 1601 is configured to send configuration information of a reference signal.

The reference signal sending unit 1602 is configured to send the reference signal according to the configuration information.

In the embodiment of the present application, the reference signal includes at least one of: a cell-specific reference signal or a user-specific reference signal.

In the embodiment of the present application, the apparatus further includes a determination unit 1603 configured to determine a position of the reference signal in time domain and/or frequency domain based on a cell identifier.

In the embodiment of the present application, the apparatus further includes an indication unit 1604.

The indication unit 1604 is configured to send the configuration information of the reference signal through user-specific RRC signaling or a system message.

The configuration information sending unit 1601 is further configured to send the configuration information of the reference signal through user-specific RRC signaling or a system message.

In the embodiment of the present application, the configuration information includes at least one of the following parameters: position information of a subframe carrying the reference signal, a transmission period, a transmission interval, information about a time domain position within the subframe, information about a frequency domain position within the subframe, or a sequence number of a basic pattern of the reference signal.

In the embodiment of the present application, the configuration information includes operation mode and special subframe configuration information.

The sending unit is further configured to: if the operation mode is a guard band mode and a downlink timeslot of the special subframe includes N downlink symbols, send the reference signal on the N downlink symbols.

The sending unit is further configured to: if the operation mode is an inband mode and a downlink timeslot of the special subframe includes H downlink symbols, send the reference signal on T downlink symbols among the H downlink symbols, where T is less than H.

In the embodiment of the present application, the configuration information includes muting indication information; and when the muting indication information indicates muting, a resource element other than a resource element on which the reference signal is located on the OFDM symbol sending the reference signal is a muting resource element, where no data is mapped or sent on the muting resource element.

In the embodiment of the present application, a subframe carrying the reference signal includes an invalid subframe. The invalid subframe refers to a subframe not sending a data signal. The data signal includes a common signal and single-user data; the common signal includes at least: a synchronization signal, a broadcast message, and a system message.

In the embodiment of the present application, the determination unit 1603 is specifically configured for:
  performing a modulo operation on the cell identifier and a first preset value to obtain a first remainder; and determining the position of the reference signal in frequency domain based on the first remainder; or
  dividing the cell identifier by the first preset value, and performing a modulo operation on a calculation result of the dividing and a second preset value to obtain a second remainder; and determining the position of the reference signal in frequency domain based on the first remainder and determining the position of the reference signal in time domain based on the second remainder; or
  dividing the cell identifier by the first preset value, and performing the modulo operation on the calculation result of the dividing and the second preset value to obtain the second remainder; and determining the position of the reference signal in frequency domain based on the second remainder and determining the position of the reference signal in time domain based on the first remainder.

The above-mentioned modulo operation and calculation operation merely characterize how to obtain the first remainder and the second remainder through the cell identifier, and the specific implementation can be performed in various manners, such as table mapping, where as long as the actual result obtained from the table mapping is the same as the result obtained from the modulo operation and calculation operation of the present application, the table mapping is also within the scope of protection of the present application.

In the embodiment of the present application, the first preset value is an integer multiple of 3, and the second preset value is an integer multiple of 2; or the first preset value is an integer multiple of 2, and the second preset value is an integer multiple of 3.

In the embodiment of the present application, for an inband mode, the reference signal is located, in time domain, on an OFDM symbol on which CRS is not located.

In the embodiment of the present application, the time domain position of the reference signal is determined according to a CRS included on a non-PDCCH symbol on a subframe transmitting the reference signal, where the non-PDCCH symbol refers to an OFDM symbol on which PDCCH is not located.

In the embodiment of the present application, for a guard band mode and a standalone mode, an identical port of the reference signal occupies two consecutive symbols in time domain.

In the embodiment of the present application, a sequence of the reference signal includes an orthogonal cover code sequence and a pseudo-random sequence, and the orthogonal cover code sequence and the pseudo-random sequence are determined according to a cell identifier; or the sequence of the reference signal includes a pseudo-random sequence, and the pseudo-random sequence is determined according to the cell identifier.

In the embodiment of the present application, the orthogonal cover code (OCC) sequence is selected according to the following formula: floor(cell identifier/(X×Y)) mod Z, where Y is an integer multiple of 1 or 2, X is an integer multiple of 1 or 3, and Z is a quantity of OCC sequences.

It should be understood by those skilled in the art that implementation of functions of various units in the signal sending apparatus in FIG. 16 may be understood with reference to the related description of the foregoing signal sending method. The functions of the various units in the signal sending apparatus in FIG. 16 may be implemented by programs running on a processor or by specific logic circuits.

In practical applications, functions implemented by various units in the signal sending apparatus may all be implemented by a central processing unit (CPU), or a micro processor unit (MPU), or a digital signal processor (DSP), or a field programmable gate array (FPGA) or the like located in the signal sending apparatus.

Figure 17:
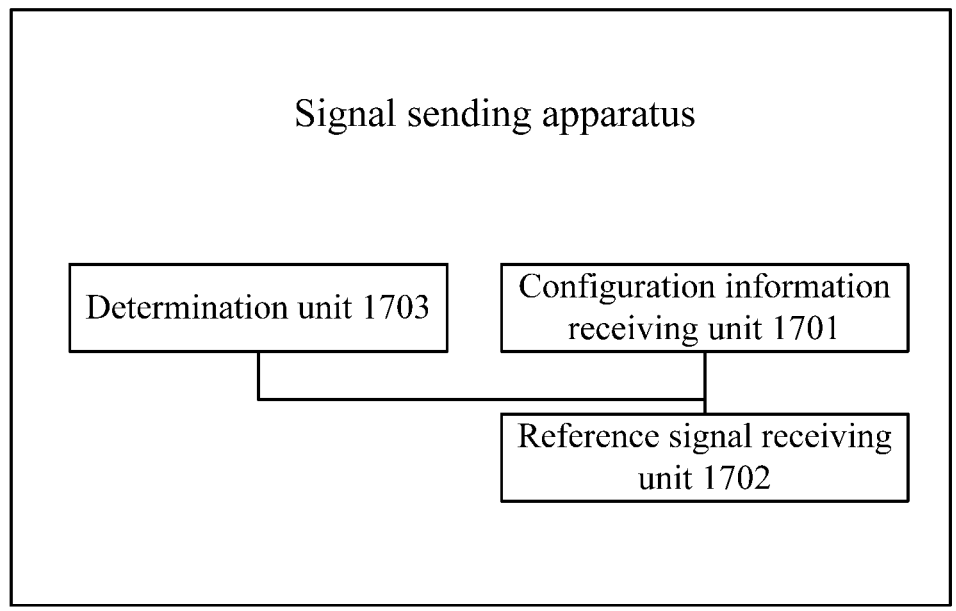
FIG. 17 is a structural diagram 1 of a signal receiving apparatus according to an embodiment of the present application.

FIG. 17 is a structural diagram 1 of a signal receiving apparatus according to an embodiment of the present application. As shown in FIG. 17, the apparatus includes a configuration information receiving unit 1701 and a reference signal receiving unit 1702.

The configuration information receiving unit 1701 is configured to receive configuration information of a reference signal.

The reference signal receiving unit 1702 is configured to receive the reference signal according to the configuration information.

In the embodiment of the present application, the reference signal includes at least one of: a cell-specific reference signal or a user-specific reference signal.

In the embodiment of the present application, the apparatus further includes a determination unit 1703.

The determination unit 1703 is configured to determine a position of the reference signal in time domain and/or frequency domain based on a cell identifier.

In the embodiment of the present application, the configuration information includes at least one of the following parameters: position information of a subframe carrying the reference signal, a transmission period, a transmission interval, information about a time domain position within the subframe, information about a frequency domain position within the subframe, or a sequence number of a basic pattern of the reference signal.

In the embodiment of the present application, the configuration information includes operation mode and special subframe configuration information of.

If the operation mode is a guard band mode and a downlink timeslot of the special subframe includes N downlink symbols, the reference signal is received on the N downlink symbols.

If the operation mode is an inband mode and a downlink timeslot of the special subframe includes H downlink symbols, the reference signal is received on T downlink symbols among the H downlink symbols, where T is less than H.

In the embodiment of the present application, the configuration information includes muting indication information; and when the muting indication information indicates muting, a resource element other than a resource element on which the reference signal is located on the OFDM symbol sending the reference signal is a muting resource element, where no data is mapped or sent on the muting resource element.

In the embodiment of the present application, a subframe carrying the reference signal includes an invalid subframe. The invalid subframe refers to a subframe for not sending a data signal. The data signal includes a common signal and single-user data; the common signal includes at least: a synchronization signal, a broadcast message, and a system message.

In the embodiment of the present application, the determination unit 1703 is further configured for:
  performing a modulo operation on the cell identifier and a first preset value to obtain a first remainder; and determining the position of the reference signal in frequency domain based on the first remainder; or
  dividing the cell identifier by the first preset value, and performing a modulo operation on a calculation result of the dividing and a second preset value to obtain a second remainder; and determining the position of the reference signal in frequency domain based on the first remainder and determining the position of the reference signal in time domain based on the second remainder; or
  dividing the cell identifier by the first preset value, and performing the modulo operation on the calculation result of the dividing and the second preset value to obtain the second remainder; and determining the position of the reference signal in frequency domain based on the second remainder and determining the position of the reference signal in time domain based on the first remainder.

The above-mentioned modulo operation and calculation operation merely characterize how to obtain the first remainder and the second remainder through the cell identifier, and the specific implementation can be performed in various manners, such as table mapping, where as long as the actual result obtained from the table mapping is the same as the result obtained from the modulo operation and calculation operation of the present application, the table mapping is also within the scope of protection of the present application.

In the embodiment of the present application, the first preset value is an integer multiple of 3, and the second preset value is an integer multiple of 2; or the first preset value is an integer multiple of 2, and the second preset value is an integer multiple of 3.

In the embodiment of the present application, for an inband mode, the reference signal received on an invalid subframe is located, in time domain, on an OFDM symbol on which CRS is not located.

In the embodiment of the present application, the time domain position of the reference signal is determined according to a CRS included on a non-PDCCH symbol on a subframe transmitting the reference signal, where the non-PDCCH symbol refers to an OFDM symbol on which PDCCH is not located.

In the embodiment of the present application, for a guard band mode and a standalone mode, an identical port of the reference signal occupies two consecutive symbols in time domain.

In the embodiment of the present application, a sequence of the reference signal includes an orthogonal cover code sequence and a pseudo-random sequence, and the orthogonal cover code sequence and the pseudo-random sequence are determined according to a cell identifier; or the sequence of the reference signal includes a pseudo-random sequence, and the pseudo-random sequence is determined according to the cell identifier.

In the embodiment of the present application, the orthogonal cover code (OCC) sequence is selected according to the following formula: floor(cell identifier/(X×Y)) mod Z, where Y is an integer multiple of 1 or 2, X is an integer multiple of 1 or 3, and Z is a quantity of OCC sequences.

It should be understood by those skilled in the art that implementation of functions of various units in the signal receiving apparatus in FIG. 17 may be understood with reference to the related description of the foregoing signal receiving method. The functions of the various units in the signal receiving apparatus in FIG. 17 may be implemented by programs running on a processor or by specific logic circuits.

In practical applications, the functions implemented by various units in the signal sending apparatus may all be implemented by a CPU, or an MPU, or a DSP, or an FPGA or the like located in the signal sending apparatus.

FIG. 18 is a structural diagram 2 of a signal sending apparatus according to an embodiment of the present application. As shown in FIG. 18, the apparatus includes a spreading unit 1801 and a sending unit 1802.

The spreading unit 1801 is configured to map and spread a code word on a preset number of subframes or resource units.

The sending unit 1802 is configured to send the code word mapped and spread on the preset number of subframes or resource units.

In the embodiment of the present application, the preset number is 2N or $2^n$×N, where N is the number of subframes or resource units indicated by resource allocation in downlink control information, and n is an integer greater than 1.

In the embodiment of the present application, the spread unit 1801 is further configured to:
  in response to determining that a data coding code rate is greater than a first threshold and/or that the number of data sending repetitions is greater than a second threshold, map and spread the code word on the preset number of subframes or resource units; or
  in response to determining that a value of modulation and coding signaling is greater than a third threshold and that the number of data sending repetitions is greater than the second threshold, map and spread the code word on the preset number of subframes or resource units; or
  in response to determining that the data coding code rate is greater than the first threshold, map and spread the code word on the preset number of subframes or resource units; or
  in response to determining that the value of the modulation and coding signaling is greater than the third threshold, map and spread the code word on the preset number of subframes or resource units.

In the embodiment of the present application, the first threshold or the second threshold is configured through signaling; or the first threshold or the second threshold is determined in a preset manner.

It should be understood by those skilled in the art that implementation of functions of various units in the signal sending apparatus in FIG. 18 may be understood with reference to the related description of the foregoing signal sending method. The functions of the various units in the signal sending apparatus in FIG. 18 may be implemented by programs running on a processor or by specific logic circuits.

In practical applications, the functions implemented by various units in the signal sending apparatus may all be implemented by a CPU, or an MPU, or a DSP, or an FPGA or the like located in the signal sending apparatus.

FIG. 19 is a structural diagram 2 of a signal receiving apparatus according to an embodiment of the present application. As shown in FIG. 19, the apparatus includes a receiving unit 1901.

The receiving unit 1901 is configured to receive a spread and mapped code word on the preset number of subframes or resource units.

In the embodiment of the present application, the preset number is 2N or $2^n$×N, where N is the number of subframes or resource units indicated by resource allocation in downlink control information, and n is an integer greater than 1.

In the embodiment of the present application, in response to determining that a data coding code rate is greater than a first threshold and that the number of data sending repetitions is greater than a second threshold, the code word is mapped and spread on the preset number of subframes or resource units.

Alternatively, in response to determining that a value of modulation and coding signaling is greater than a third threshold and that the number of data sending repetitions is greater than the second threshold, the code word is mapped and spread on the preset number of subframes or resource units.

Alternatively, in response to determining that the data coding code rate is greater than the first threshold, the code word is mapped and spread on the preset number of subframes or resource units.

Alternatively, in response to determining that the value of the modulation and coding signaling is greater than the third threshold, the code word is mapped and spread on the preset number of subframes or resource units.

In the embodiment of the present application, the first threshold or the second threshold is configured through signaling; or the first threshold or the second threshold is determined in a preset manner.

It should be understood by those skilled in the art that implementation of functions of various units in the signal receiving apparatus in FIG. 19 may be understood with reference to the related description of the foregoing signal receiving method. The functions of the various units in the signal receiving apparatus in FIG. 19 may be implemented by programs running on a processor or by specific logic circuits.

In practical applications, the functions implemented by various units in the signal sending apparatus may all be implemented by a CPU, or an MPU, or a DSP, or an FPGA or the like located in the signal sending apparatus.

The signal sending apparatus and signal receiving apparatus described in the embodiments of the present application may also be stored in a computer-readable storage medium if the service signaling tracking apparatus is implemented in the form of software functional module and sold or used as independent products. Based on this understanding, the technical solutions provided by the embodiments of the present application substantially, or the part contributing to the existing art, may be embodied in the form of a software product. The computer software product is stored in a storage medium and includes several instructions for enabling a computer device (which may be a personal computer, a server or a network apparatus, etc.) to execute all or part of the methods provided by the embodiments of the present application. The foregoing storage medium includes: a USB flash disk, a mobile hard disk, a read only memory (ROM), a magnetic disk, an optical disk or another medium capable of storing program codes. In this way, the embodiments are not limited to any particular combination of hardware and software.

Accordingly, the embodiments of the present application further provide a computer storage medium which stores computer programs configured to execute the signal sending/receiving method according to the embodiments of the present application.

Although the preferred embodiments of the present application have been disclosed for illustrative purposes, those skilled in the art will appreciate that various modifications, additions and substitutions are possible, and accordingly, the scope of the present application should not be limited to the embodiments set forth above.

What is claimed is:

1. A signal sending method, comprising:
   sending configuration information of a reference signal; and
   sending the reference signal according to the configuration information;
   wherein sending the configuration information of the reference signal comprises:
   sending the configuration information of the reference signal through user-specific radio resource control (RRC) signaling or a system message;
   wherein the configuration information comprises muting indication information; and in response to determining that the muting indication information indicates muting, no data is mapped or sent on a muting resource element.

2. The signal sending method of claim 1, wherein the reference signal comprises at least one of: a cell-specific reference signal or a user-specific reference signal.

3. The signal sending method of claim 1, further comprising:
   determining a position of the reference signal in time domain and/or frequency domain based on a cell identifier.

4. The signal sending method of claim 1, wherein the configuration information comprises at least one of following parameters: position information of a subframe carrying the reference signal, a transmission period, a transmission interval, information about a time domain position within the subframe, information about a frequency domain position within the subframe, or a sequence number of a basic pattern of the reference signal.

5. The signal sending method of claim 1, wherein the configuration information comprises an operation mode and special subframe configuration information.

6. The signal sending method of claim 5, wherein if the operation mode is a guard band mode and a downlink timeslot of the special subframe comprises N downlink symbols, the reference signal is sent on the N downlink symbols.

7. The signal sending method of claim 5, wherein if the operation mode is an inband mode and a downlink timeslot of the special subframe comprises H downlink symbols, the reference signal is sent on T downlink symbols among the H downlink symbols, wherein T is less than H.

8. The signal sending method of claim 1, wherein determining the position of the reference signal in time domain and/or frequency domain based on the cell identifier comprises one of:
   performing a modulo operation on the cell identifier and a first preset value to obtain a first remainder; and determining the position of the reference signal in frequency domain based on the first remainder;
   dividing the cell identifier by the first preset value, and performing a modulo operation on a calculation result of the dividing and a second preset value to obtain a second remainder; and
   determining the position of the reference signal in frequency domain based on the first remainder and determining the position of the reference signal in time domain based on the second remainder; or
   dividing the cell identifier by the first preset value, and performing the modulo operation on the calculation result of the dividing and the second preset value to obtain the second remainder; and determining the position of the reference signal in frequency domain based on the second remainder and determining the position of the reference signal in time domain based on the first remainder.

9. The signal sending method of claim 8, wherein the first preset value is an integer multiple of 3, and the second preset value is an integer multiple of 2; or the first preset value is an integer multiple of 2, and the second preset value is an integer multiple of 3.

10. The signal sending method of claim 1, wherein for an inband mode, the reference signal is located, in time domain, on an orthogonal frequency division multiplexing (OFDM) symbol on which a cell reference signal (CRS) is not located.

11. The signal sending method of claim 1, wherein a time domain position of the reference signal is determined according to a CRS comprised on a non-physical downlink control channel (PDCCH) symbol on a subframe transmitting the reference signal, wherein the non-PDCCH symbol refers to an OFDM symbol on which a PDCCH is not located.

12. The signal sending method of claim 1, wherein for a guard band mode and a standalone mode, an identical port of the reference signal occupies two consecutive symbols in time domain.

13. The signal sending method of claim 1, further comprising:
   a sequence of the reference signal comprising an orthogonal cover code (OCC) sequence and a pseudo-random sequence, and determining the OCC sequence and the pseudo-random sequence according to a cell identifier; or
   the sequence of the reference signal comprising a pseudo-random sequence, and determining the pseudo-random sequence according to the cell identifier.

14. The signal sending method of claim 13, further comprising:
   selecting the OCC sequence according to a following formula: floor(cell identifier/(X×Y)) mod Z, wherein Y is an integer multiple of 1 or 2, X is an integer multiple of 1 or 3, and Z is a quantity of OCC sequences.

15. A signal receiving method, comprising:
   receiving configuration information of a reference signal; and
   receiving the reference signal according to the configuration information;

wherein the configuration information comprises muting indication information; and in response to determining that the muting indication information indicates muting, no data is mapped or sent on a muting resource element.

16. The signal receiving method of claim 15, further comprising:

determining a position of the reference signal in time domain and/or frequency domain based on a cell identifier;

wherein the configuration information comprises at least one of following parameters: position information of a subframe carrying the reference signal, a transmission period, a transmission interval, information about a time domain position within the subframe, information about a frequency domain position within the subframe, or a sequence number of a basic pattern of the reference signal;

wherein the configuration information comprises an operation mode and special subframe configuration information;

wherein the subframe carrying the reference signal includes an invalid subframe;

wherein for an inband mode, the reference signal received on the invalid subframe is located, in time domain, on an orthogonal frequency division multiplexing (OFDM) symbol on which a cell reference signal (CRS) is not located;

wherein the time domain position of the reference signal is determined according to a CRS comprised on a non-physical downlink control channel (PDCCH) symbol on a subframe transmitting the reference signal, wherein the non-PDCCH symbol refers to an OFDM symbol on which a PDCCH is not located; and wherein for a guard band mode and a standalone mode, an identical port of the reference signal occupies two consecutive symbols in time domain.

17. The signal receiving method of claim 15, further comprising:

a sequence of the reference signal comprising an orthogonal cover code sequence and a pseudo-random sequence, and determining the orthogonal cover code sequence and the pseudo-random sequence according to a cell identifier; or the sequence of the reference signal comprising a pseudo-random sequence, and determining the pseudo-random sequence according to the cell identifier.

18. A signal sending apparatus, comprising a processor and a memory, wherein the memory is configured to store a computer program, and the computer program, when being executed by the processor, cause the processor to:

send configuration information of a reference signal; and send the reference signal according to the configuration information;

wherein the computer program, when being executed by the processor, further cause the processor to:

send the configuration information of the reference signal through user-specific radio resource control (RRC) signaling or a system message;

wherein the configuration information comprises muting indication information; and in response to determining that the muting indication information indicates muting, no data is mapped or sent on a muting resource element.

19. A signal receiving apparatus, comprising a processor and a memory, wherein the memory is configured to store a computer program, and the computer program, when being executed by the processor, cause the processor to implement the signal receiving method of claim 15.

* * * * *